United States Patent [19]
Boyer et al.

[11] Patent Number: 6,154,469
[45] Date of Patent: Nov. 28, 2000

[54] VOICE FREQUENCY DATA ENHANCEMENT METHOD

[75] Inventors: Gerald R. Boyer, Mountain Lakes; Ronald Robert Brown, Florham Park, both of N.J.; Eric A. Deichstetter, Naperville, Ill.; Jeffrey Louis Duffany; Phillip C. Goelz, both of Morristown, N.J.; Hoo-Yin Khoe, Morris Plains, N.J.; Dennis Loge, Geneva; Joseph J. Kott, Aurora, both of Ill.; David Reagan Rice, Morristown, N.J.

[73] Assignee: Lucent Technologies, Inc., Murray Hill, N.J.

[21] Appl. No.: 09/018,982

[22] Filed: Feb. 5, 1998

[51] Int. Cl.[7] .................................................. H04J 3/12
[52] U.S. Cl. ........................... 370/528; 370/523; 370/496
[58] Field of Search ........................................ 370/230, 395, 370/469, 474, 479, 522, 437, 496, 523, 528

[56] References Cited

U.S. PATENT DOCUMENTS

| 5,822,420 | 10/1998 | Bolon et al. | 379/230 |
| 5,825,780 | 10/1998 | Christie | 370/522 |
| 5,883,893 | 3/1999 | Rumer et al. | 370/395 |

Primary Examiner—Chi H. Pham
Assistant Examiner—Brenda Pham
Attorney, Agent, or Firm—Steve Mendelsohn

[57] ABSTRACT

The present invention provides a method for conveying information over a communication network such as a Digital Loop Carrier network free of in-band signaling information for at least a portion of an established communication between at least two users so as to reduce the information error rate associated with the established communication.

26 Claims, 4 Drawing Sheets

VOICE FREQUENCY DATA ENHANCEMENT METHOD

FIELD OF THE INVENTION

This invention relates to telecommunications networks and more particularly to a method for reducing information error rates of communication channels within telecommunication networks.

DESCRIPTION OF THE RELATED ART

The use of communication networks such as telephony networks and data communication networks (e.g., the Internet) by the general public to convey information has increased significantly in the past several years. The information is represented by analog and/or digital communication signals. A telephony network provides traditional telephony services (e.g., voice communications, facsimile communications, analog data) over such media as twisted metallic wire pairs (e.g., tip/ring pairs), coaxial cables, fiber optic cables, air, free space, and other media. The Public Switched Telephone Network (PSTN) is an established telephony network which is accessible to the general public. A data communication network is a network in which information signals are conveyed throughout the network in digital form. Examples of a data communication network include the public Internet, and computer communication networks (e.g., corporate communication networks, educational communication networks, governmental communication networks).

Often, users of telephony networks, computer communication networks and other communication networks gain access to such networks via local access networks such as a Digital Loop Carrier (DLC) system. An exemplary DLC system is shown in FIG. 1. DLC 10 comprises Remote Terminal (RT) 28 connected to Local Digital Switch (LDS) 20 via communication link 26. Communication signals are exchanged between LDS 20 and communication link 26 via interface 24. LDS 20 is connected to PSTN 12 and Public Internet 14 via communication links 18 and 16 respectively. Remote Terminal 28 is connected to user 1 (34) via communication link 30 and to user 2 (36) via communication link 32. Users 1 and 2 thus have access to Public Internet 14, PSTN 12 and to each other. For the sake of clarity only two users are shown in FIG. 1. In practice, DLC systems connect hundreds or even thousands of users. Moreover, an actual DLC system, such as the one shown in FIG. 1, may provide access to a variety of communication networks in addition to the ones shown.

Communication links 30 and 32 are currently implemented with metallic wires (i.e., tip/ring pairs) through which analog communication signals (e.g., voice, facsimile) are conveyed between the users (34, 36) and Remote Terminal 28. Communication links 30 and 32, when implemented as metallic tip/ring pairs, are part of the well known Plain Old Telephone Service (POTS) telephony system and such links are commonly referred to as POTS lines. POTS lines typically are able to convey analog communication signals within a limited bandwidth spanning the frequency range of 0–4 KHz commonly referred to as Voice Frequencies (VF). The VF range is typically further band limited to a frequency range of 200 Hz–3400 Hz due to additional analog filtering by DLC 10 equipment.

Users who wish to communicate with data communication networks such as the Public Internet typically use modems to transmit and receive analog data signals over the POTS lines. The analog signals from communication links 30 and 32 are converted to digital signals by RT 28 and are conveyed over communication link 26. The digital signals are processed in accordance with a protocol being followed by DLC 10 and are transferred to LDS 20 which transmits such digital signals to either PSTN 12 or Public Internet 14 via communication links 18 or 16 respectively. A protocol is a set of rules and standards that govern the operation of the various equipment of a communication network such as a local access network so as to control, monitor, and/or manage communications between users of the same or different networks and also between equipment of the same or different networks. Part of the protocol information is referred to as signaling information which is used to initiate communication between users, monitor the channel through which information is being conveyed during user communications and terminate communications between users. The signaling information is often generated by the various communication network equipment (e.g., RT 28, LDS 20).

Before users of the same or different networks can communicate with each other, the communication is established in accordance with the protocol. A communication is established when the system has allocated appropriate network resources (e.g., a communication channel) and has followed certain procedural steps defined by the protocol, to allow users to convey communication signals to each other within a communication network or different networks. The communication signals conveyed between users is referred to as user information. Examples of protocols used by local access networks (particularly in North America) and other communication networks include the well known TR-303 Hybrid Signaling protocol and the TR-08 protocol.

Still referring to FIG. 1, LDS 20 also receives user information from either PSTN 12 or Public Internet 14 and transmits such information to RT 28 which converts the information to the proper analog signal for propagation through communication links 30 or 32. The signaling information is extracted by RT 28 and the remaining user information is relayed to the users. It should also be noted that communication links 30 and 32 need not be analog POTS lines but can be other communication links through which digital and/or analog communication signals are conveyed.

The user information conveyed through the various communication links of local access network 10 is packaged and structured in accordance with well defined communication channel formats. An example of a communication channel format used in many local access networks and other communication networks is the well known Digital Signal Zero (DS0) channel format. A DS0 channel is defined as a communication channel with an information capacity of 64 kbps (64 kilobits per second). Part of the information conveyed through the communication channels represents protocol information. Communication links can also be formatted as per a Digital Signal One (DS1) channel structure. A DS1 channel contains 24 DS0 channels.

The digital signals conveyed between RT 28 and LDS 20 over communication link 26 are organized in a particular fashion dictated by the protocol being followed by the local access network.

Referring to FIG. 2, there is shown how digital signals are organized and conveyed over communication link 26 between LDS 20 and RT 28 as per the TR-303 Hybrid Signaling protocol. Communication link 26 is organized as a DS1 channel. Typically, the analog signals from the users are sampled by RT 28 at a rate of 8000 samples per second. RT 28 converts each sample to an 8 bit word which is then placed in a particular DS0 channel within the DS1 channel of communication link 26. In particular, the digital signals are organized as frames (38) with each frame being 125 μsec long (i.e., length of one sample). Each frame (38) comprises 24 DS0 channels (40) where each DS0 channel contains the 8 bits of data representing a sample from a particular user, and a framing bit (43) used as an indicator for separating the frames. Thus, a DS1 channel can serve up to 24 separate users.

The TR-303 Hybrid Signaling protocol allows signaling information to be integrated with user information and both types of information are conveyed through the DS1 channel. Such a technique of integrating user information with signaling information is commonly referred to as in-band signaling (or in-slot signaling). Still referring to FIG. 2, part of each user's information, and in particular, the least significant bit (42) of each DS0 channel of every sixth frame is discarded and replaced with a signaling bit that represents signaling information. The information that replaces the discarded user information is referred to as in-band signaling information. The in-band signaling scheme where the least significant bit of user information is purposely discarded and replaced with signaling information is referred to as Robbed Bit Signaling (RBS). The TR-303 Hybrid Signaling protocol uses the Robbed Bit Signaling scheme.

FIG. 2 discloses a particular form of RBS structured in what is commonly known as a DS1 frame format. In this particular version of RBS, the least significant bit (42) of every DS0 channel within the $6^{th}$ frame, the $12^{th}$ frame, the $18^{th}$ frame, and the $24^{th}$ frame etc . . . is replaced with signaling information. For purposes of clarity, only the configuration of the $6^{th}$ frame is shown in FIG. 2.

As the popularity of data communication networks such as the Internet increases, there is an ever increasing need by users of local access networks to convey information to and from such networks at higher and higher speeds. At such high speeds and in view of the limited bandwidth of the POTS lines, signal degradation is often a problem. The analog data signals tend to be more susceptible to noise and are more easily distorted by bandwidth limited media such as POTS lines.

It will be readily understood that the use of the RBS scheme, or other in-band signaling schemes, in which part of the user information is sacrificed for signaling information, is another contributor to the signal degradation suffered by local access network 10 and other similar communication networks. The use of in-band signaling schemes often degrades the performance of local access networks and other communication networks because of the increase in the information error rate (e.g., high bit error rates) and /or lowered throughput. Typically, a certain amount of errors occurs in the conveyance of user information at a particular speed for a particular amount time. For a certain time period, the ratio of the amount of errors occurring in conveyed user information to the amount of user information is defined as information error rate. The throughput is defined as the actual amount of information conveyed. Often, subscribers or the local access network equipment must reduce the speed at which information is being conveyed through the local access network in order to lower the information error rates to an acceptable level. For example, many subscribers who use 56 Kb/s, 33.6 Kb/s or even 28.8 Kb/s modems to convey information through communication channels of local access networks have to operate their modems at lower speeds because of the exacerbating effects of in-band signaling such as RBS. As a result, the throughput of these communication channels is decreased.

It is therefore, an object of the present invention to eliminate substantially the adverse effects (e.g., increased information error rate, lowered throughput) of in-band signaling schemes such as RBS during communications between users of local access networks or other communication networks.

SUMMARY OF THE INVENTION

The present invention provides for a method, which when applied to a communication network that uses in-band signaling, suspends the application of in-band signaling for at least a portion of established communication between at least two users of the communication so as to reduce information error rates associated with the established communication. The method of the present invention comprises the steps of establishing communication between at least two users in accordance with a protocol and conveying information free of in-band signaling information so as to reduce information error rates associated with the conveyed user information.

DETAILED DESCRIPTION

The present invention provides a method, which when applied to a communication network that uses an in-band signaling scheme, suspends the application of the in-band signaling for at least a portion of established communications between users of the communication network during which the communication network operates in a clear channel mode that serves to reduce information error rates associated with the established communication. The clear channel mode occurs after communication between at least two users is established. In the clear channel mode, no in-band signaling information is conveyed; the user information is conveyed free of signaling information. The duration of the clear channel mode may occur for part or all of the established communication between users.

It will be readily understood that the method of the present invention is applicable to all protocols which use an in-band signaling scheme. It should further be understood that the implementation of the present invention within existing communication networks that comply with an in-band signaling protocol can be made transparent to the operation of such networks. As such, the present invention represents an added feature to protocols with in-band signaling and allows such protocols to operate in the clear channel mode without adversely affecting in any significant manner their standard operation. Furthermore, the method of the present invention will be described in the context of DLC 10. However, it should be readily obvious to one skilled in the art to which this invention belongs that the method of the present invention is applicable to other types of communication networks and is not limited to local access networks such as DLC 10.

Figure 1:
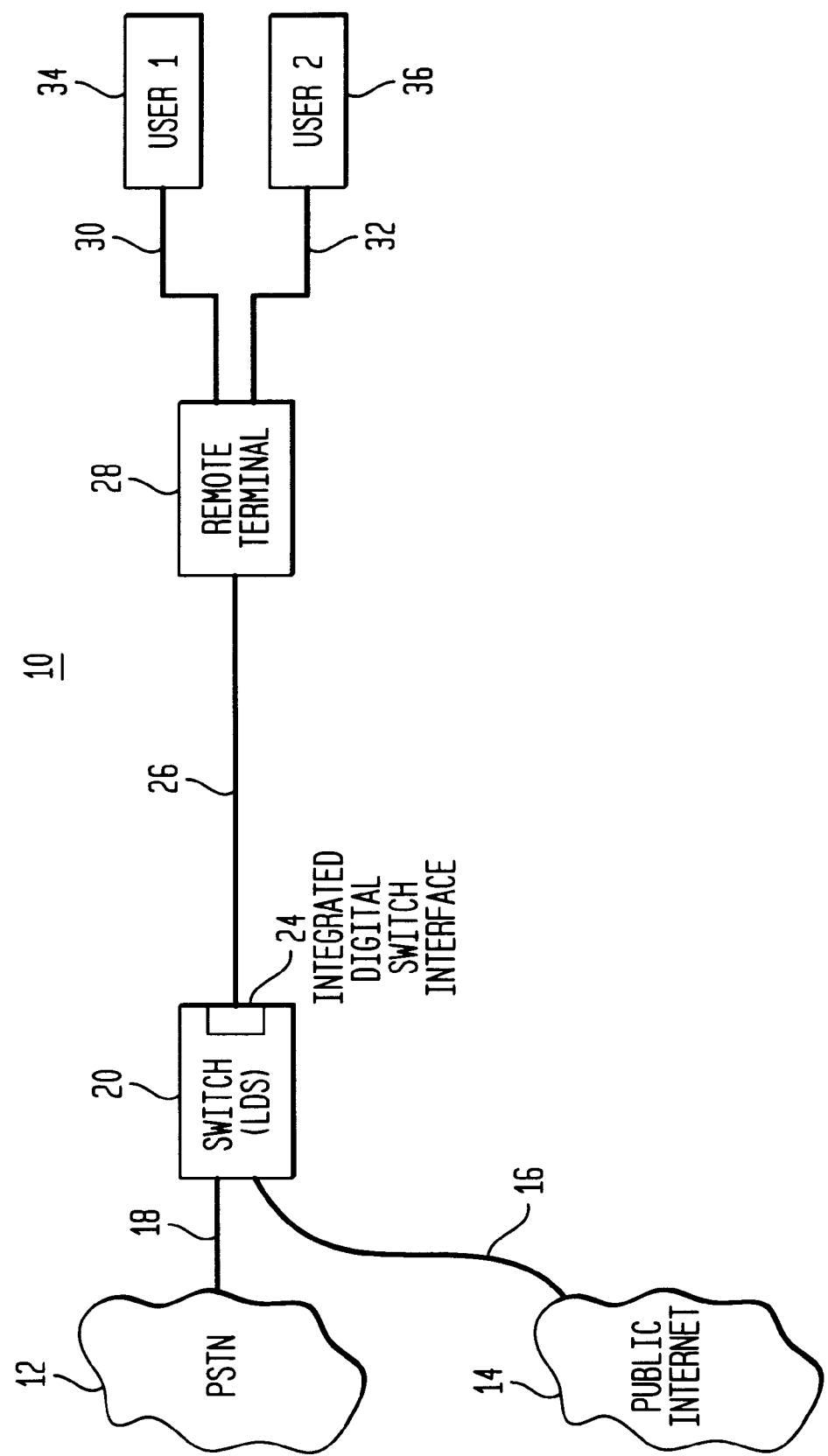
FIG. 1 is a block diagram of an exemplary local access communication network called a Digital Loop Carrier system.
Figure 2:
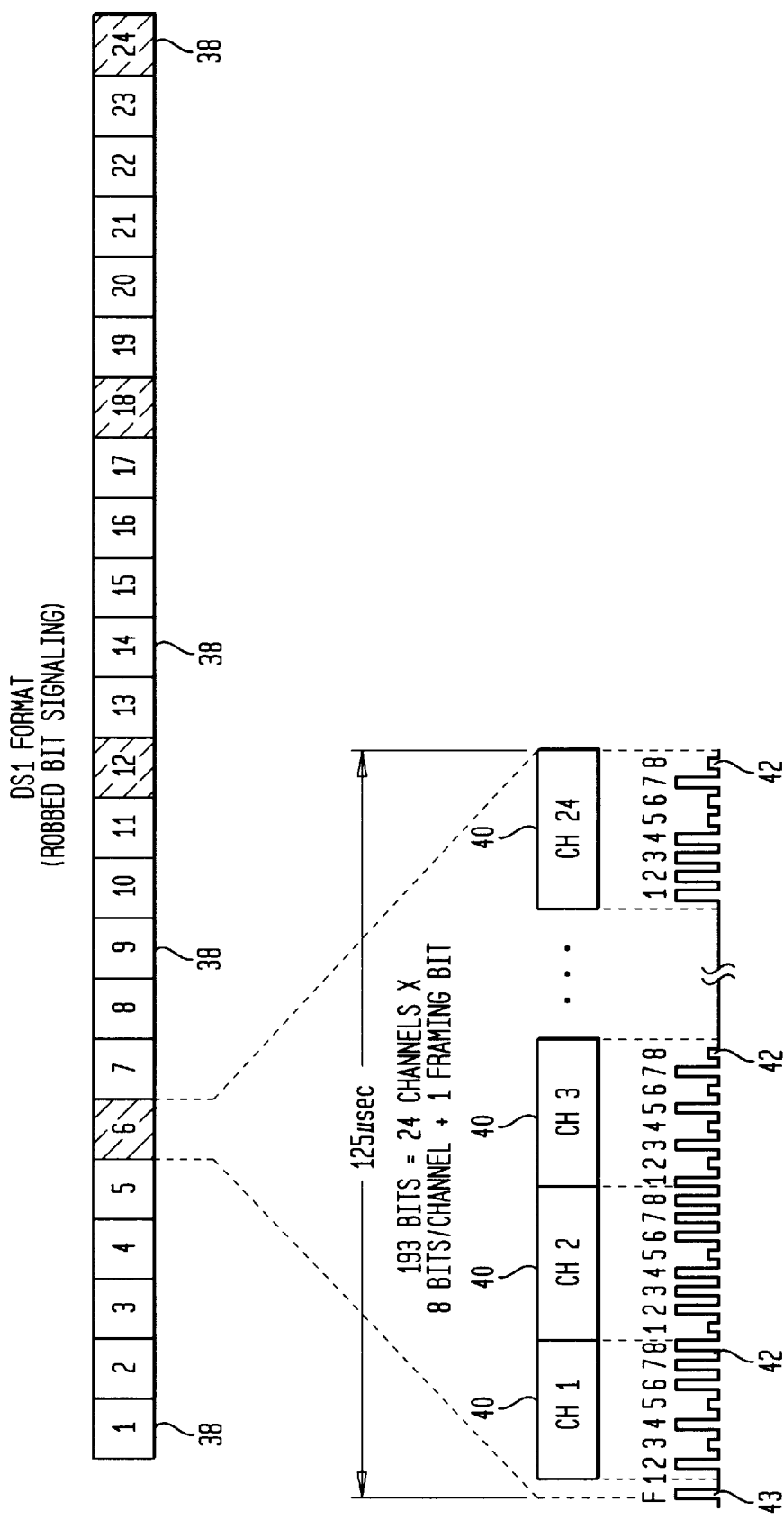
FIG. 2 is a diagram of a data structure for a DS1 frame format for the Robbed Bit Signaling (RBS) scheme.
Figure 3:
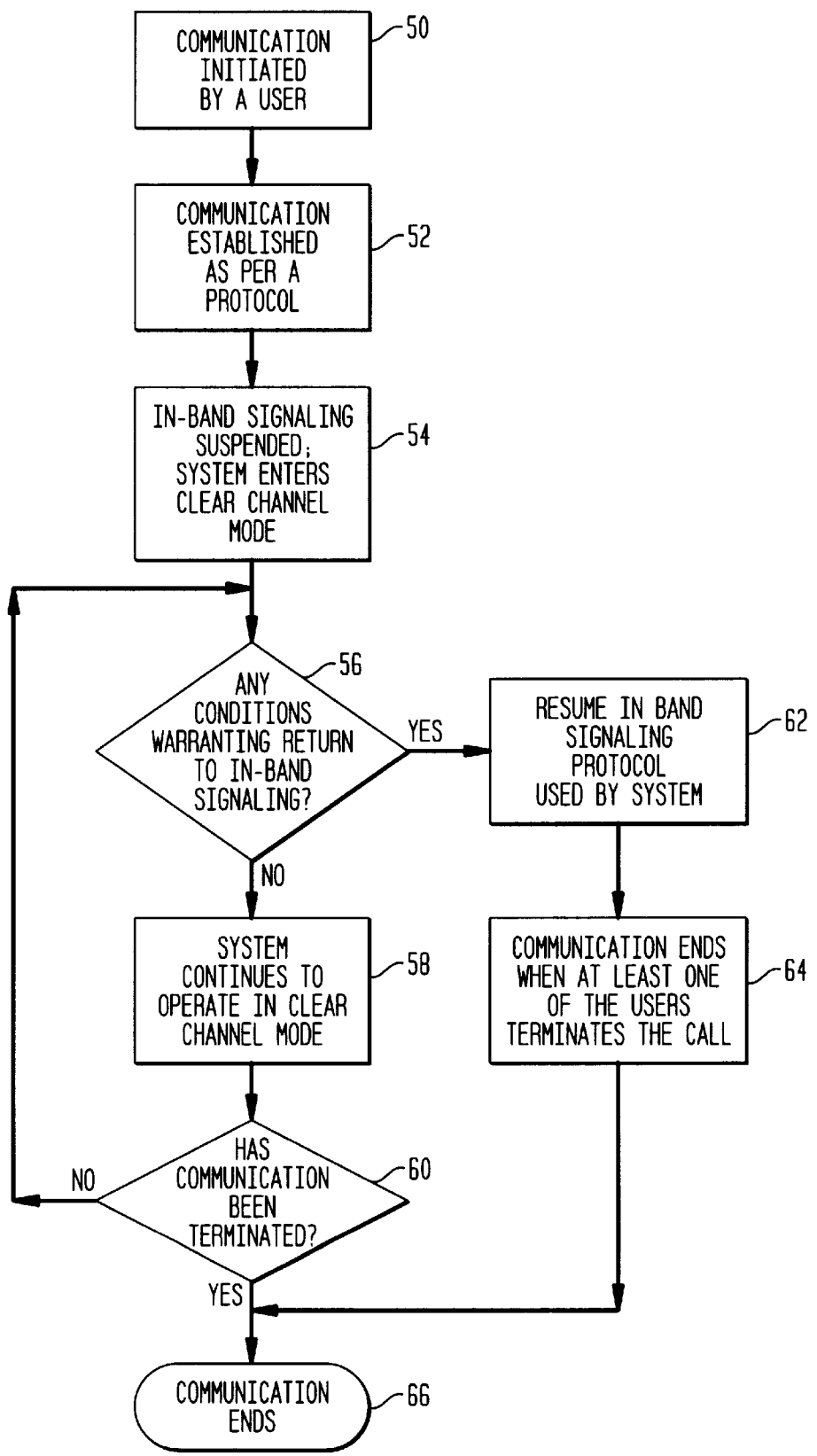
FIG. 3 is a flowchart of the method of the present invention.

FIG. 3 depicts the method of the present invention which starts with step 50 in which communication is initiated by a user of a local access network such as DLC 10 of FIG. 1. For example, referring back to FIG. 1, user 1 may wish to communicate via a modem to a user within Public Internet 14. User 1 does this by placing a call to the user that is part of the Internet. A call is defined as the completion of an established communication and the conveyance of information between at least two users of the same or different networks in accordance with the protocols of the networks. Users can communicate with each other with communicating devices such as modems, telephones, facsimile machines, and computers. User 1 first goes Off Hook which is a condition that is detected by DLC 10, in particular, RT 28. Referring again to FIG. 3, the method of the present invention now moves to step 52.

In step 52, DLC 10 and the communication network associated with the called user take the appropriate steps as per their respective protocols to establish communication between user 1 and the called user. At this point the established communication is using in-band signaling. Once communication is established between user 1 and the called user, the method of the present invention moves to step 54 where inband signaling is suspended. In step 54, DLC 10 enters the clear channel mode in which user information conveyed between RT 28 and LDS 20 has no in-band signaling information thus reducing the information error rates associated with the conveyed user information. In many protocols that use in-band signaling, there exists a separate or out of band channel through which protocol signals such as signaling information are conveyed apart from the user information. For example, the TR-303 Hybrid Signaling protocol has such a channel which is called the Timeslot Management Channel (TMC). The TMC is implemented as a DS0 channel within communication link 26. During the clear channel mode, a communication system that complies with the TR-303 Hybrid Signaling protocol for example, may continue to convey signaling information between RT 28 and LDS 20 via the TMC. DLC 10 remains in the clear channel mode (i.e., suspension of in-band signaling) for a period of time that is equal to or less than the duration of the established communication.

In step 56, the method of the present invention determines whether any condition has occurred within DLC 10 which would warrant a return to in-band signaling. Many communication networks offer various features (e.g., 3-way calling, call waiting) which when activated can be more efficiently implemented with in-band signaling. It should be noted however that the implementation of such features is dependent upon the particular design of the communication network and that such features may not necessarily specifically require the use of in-band signaling. If no such conditions occur during communication between the users, the system may operate in the clear channel mode for the duration of the established communication. In step 62 the method of the present invention has determined that it should return to in-band signaling mode. The method of the present invention remains in the in-band signaling mode until step 64 where at least one of the users has terminated (e.g., user goes On-Hook) communication or DLC 10 signaling terminates the communication. In step 66, the method of the present invention ends the communication in accordance with the particular protocol being followed by the communication system.

Referring back to step 56, when there exists no conditions warranting the return to in-band signaling, the method of the present invention moves to step 58 where the communication system continues to operate in the clear channel mode until communication has been terminated (step 60) in which case the system moves to step 66 or conditions warranting return to in-band signaling occur in which case the communication system operates in the manner described above (i.e., steps 62, 64 and 66).

Figure 4:
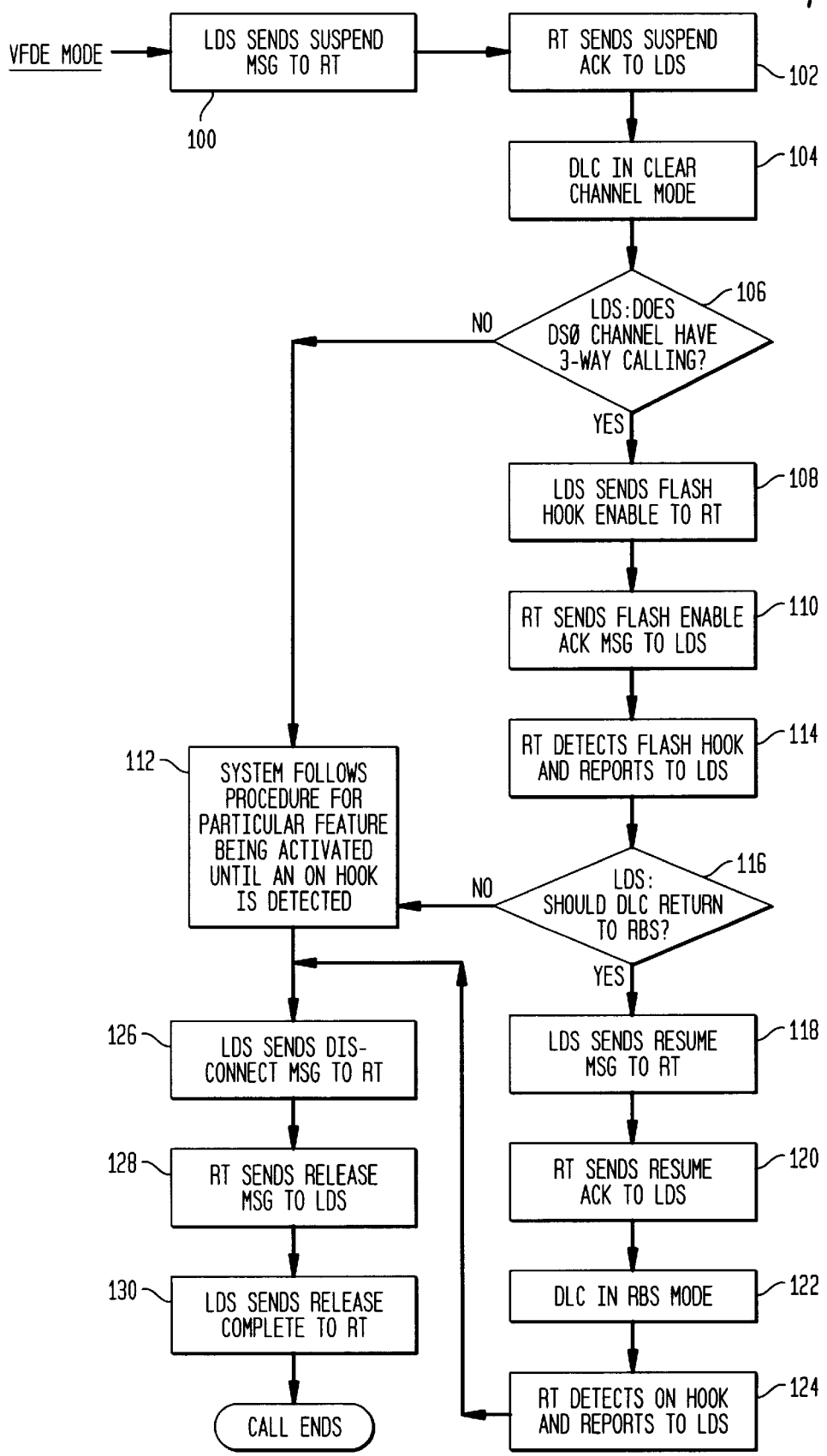
FIG. 4 is a flowchart of the method of the present invention implemented in accordance with the TR 303 hybrid signaling protocol.

FIG. 4 depicts an example of a specific version of the method of the present invention implemented in accordance with the TR-303 Hybrid Signaling protocol. More particularly, FIG. 4 depicts a particular procedure (using the TR-303 Hybrid Signaling protocol) of the method of the present invention applied to a feature commonly referred to as the 3-way calling feature. The 3-way calling feature is a well known characteristic provided by many telephony systems which allows three users to communicate with each other simultaneously. The 3-way calling feature is activated in the following manner: (1) User 1 calls User 2; either the calling party (User 1) or the called party can activate the 3-way calling feature. Say, for example, User 1 wishes to add a third party to the call; (2) User 1 performs a flash hook, i.e., User 1 presses and releases the telephone hookswitch; this action is recognized by the communication system as a flash hook; (3) User 1 now hears a dial tone and then proceeds to dial the third party's number; (4) User 1 can now communicate to the third party and after performing another flash hook can communicate with the third party and User 2 simultaneously.

FIG. 4 shows how the method of the present invention can be applied to a specific protocol (TR-303 Hybrid Signaling protocol) to implement a specific feature (i.e., 3-way calling) provided by a communication system such as DLC 10. As such FIG. 4 is simply an illustrative procedure that shows how the method of the present invention can be integrated within a particular protocol being followed by a particular communication system. A similar procedure can be implemented for other features (e.g., call-waiting) and/or other communication systems.

Prior to step 100 of FIG. 4, communication is established between at least two users of a communication system such as DLC 10 in accordance with the TR-303 Hybrid Signaling protocol. The system has provided a DS0 channel from the DS1 channel of communication link 26 for conveying information (user and signaling) between the users. Furthermore, one of the users has called the other and thus communication (exchange of communication signals) between the two users is about to start. The communication system will follow the steps of the method of the present invention while still complying with the TR-303 Hybrid Signaling protocol.

In step 100, LDS 20 transmits a "suspend" message to RT 28 via the TMC. The "suspend" message instructs RT 28 to suspend the use of Robbed Bit signaling. In step 102, RT 28 puts the DS0 channel allocated for the call in a clear channel mode and sends a "suspend acknowledge" message to LDS 20 via the TMC. In step 104 the system enters the clear channel mode. The user information being conveyed through the allocated DS0 channel does not have any embedded signaling information; i.e., there is no in-band signaling. Instead, the signaling information is conveyed through an out of band channel (e.g., the TMC). Preferably DLC 10 enters the clear channel mode within 300 milliseconds from the time communication between User 1 and the called user is established.

In step 106, LDS 20 determines whether the DS0 channel allocated for the call is authorized for the 3-way calling feature. The system moves to step 108 where LDS 20 has determined that the allocated DS0 channel does have the 3-way calling feature, and LDS 20 sends a "flash hook enable" message via the TMC to RT 28. In response, in step 110 RT 28 sends a "flash hook enable acknowledge" message to LDS 20 via the TMC. In step 114, RT 28 detects a flash hook (one of the users has applied a flash hook to initiate 3-way calling as described above) and reports it to LDS 20. In step 116, LDS 20 decides to return to RBS (i.e., in-band signaling) as the 3-way calling feature has been activated. In step 118, LDS 20 sends a "resume" message to RT 28 instructing RT 28 to activate the RBS scheme. In response, in step 120, RT 28 sends a "resume acknowledge" message to LDS 20. The system moves to step 122 in which the RBS scheme is activated. The system continues to operate in the RBS mode until RT 28 detects an On Hook condition and consequently moves to step 124 where RT 28 reports the On Hook condition to LDS 20.

When an On Hook condition is detected the method of the present invention moves to step 126 in which LDS 20 sends a "disconnect" message to RT 28. In step 128 RT 28 sends a "release" message to LDS 20. In step 130, LDS 20 sends a "release complete" message to RT 28. At this point, the established communication is terminated and the allocated DS0 channel is now made available for future communications.

Referring back to steps 106 and 116, the method of the present invention moves to step 112 for features other than 3-way calling (e.g., call-waiting) that are also activated by the application of a flash hook. In such cases, the method of the present invention would certainly apply procedures that are consistent with the protocol being followed by the communication system. It will be readily understood by those skilled in the art to which this invention belongs that the method of the present invention can be modified to apply to any and all features of protocols that use in-band signaling and that FIG. 4 is simply one example of a particular application.

We claim:

1. A method for conveying information in a communication network that follows a protocol that supports in-band signaling, the method comprising the steps of:
   (a) establishing communications over a link of the communication network during a call between at least two users in accordance with the protocol, wherein the communications between the at least two users comprise an exchange of signaling information over the link using in-band signaling in addition to an exchange of user information over the link; and
   (b) after establishing the communications, but during the call, suspending in-band signaling such that communications over the link continue in a clear channel mode free of in-band signaling.

2. The method of claim 1, wherein step (b) comprises the step of, prior to suspending in-band signaling, using in-band signaling to exchange, over the link, signaling information related to the suspension of in-band signaling.

3. The method of claim 1, wherein step (b) comprises the step of using out-of-band signaling during clear channel mode communications to exchanging signaling information.

4. The method of claim 3, wherein the out-of-band signaling is transmitted over the link.

5. The method of claim 1, further comprising the step of:
   (c) after establishing clear channel mode communications, but during the call, resuming communications using in-band signaling over the link.

6. The method of claim 5, wherein step (c) comprises the step of, prior to resuming communications using in-band signaling, using out-of-band signaling during clear channel mode communications to exchange signaling information related to the resumption of in-band signaling.

7. The method of claim 6, wherein the out-of-band signaling is transmitted over the link.

8. The method of claim 7, wherein the protocol is the TR-303 Hybrid Signaling protocol, the communications over the link are based on a DS0 channel within a DS1 frame format, the in-band signaling is robbed-bit signaling within the DS0 channel, and the out-of-band signaling uses a Timeslot Management Channel (TMC) of the TR-303 Hybrid Signaling protocol over the link.

9. The method of claim 5, wherein step (c) is initiated by detection of a flash-hook condition at one end node of the link.

10. A first node for conveying information in a communication network that follows a protocol that supports in-band signaling, the first node comprising:
    (a) a port configured to support communications over a first link to a second node of the communication network; and
    (b) one or more ports configured to support communications over one or more other links to one or more other nodes of the communication network, wherein:
    the first node is configured to establish communications over the first link with the second node during a call between at least two users in accordance with the protocol, wherein the communications between the first and second nodes comprise an exchange of signaling information over the first link using in-band signaling in addition to an exchange of user information over the first link; and
    the first node is configured to suspend in-band signaling after establishing the communications, but during the call, such that communications over the first link continue in a clear channel mode free of in-band signaling.

11. The first node of claim 10, wherein the first node is a remote terminal.

12. The first node of claim 10, wherein the first node is configured to use in-band signaling, prior to suspending in-band signaling, to exchange, over the link, signaling information related to the suspension of in-band signaling.

13. The first node of claim 10, wherein the first node is configured to use out-of-band signaling during clear channel mode communications to exchanging signaling information.

14. The first node of claim 13, wherein the out-of-band signaling is transmitted over the link.

15. The first node of claim 10, wherein the first node is configured to resume, after establishing clear channel mode communications, but during the call, communications using in-band signaling over the link.

16. The first node of claim 15, wherein the first node is configured to use out-of-band signaling during clear channel mode communications, prior to resuming communications using in-band signaling, to exchange signaling information related to the resumption of in-band signaling.

17. The first node of claim 16, wherein the out-of-band signaling is transmitted over the link.

18. The first node of claim 17, wherein the protocol is the TR-303 Hybrid Signaling protocol, the communications over the link are based on a DS0 channel within a DS1 frame format, the in-band signaling is robbed-bit signaling within the DS0 channel, and the out-of-band signaling uses a Timeslot Management Channel (TMC) of the TR-303 Hybrid Signaling protocol over the link.

19. The first node of claim 15, wherein the resumption of in-band signaling is initiated by detection of a flash-hook condition at one end node of the link.

20. A method for conveying information in a communication network that uses in-band signaling, the method comprising the steps of:

(a) establishing communications with in-band signaling over a link between at least two users of the communication network; and (b) suspending in-band signaling during communications over the link between the at least two users allowing the information to be conveyed in a clear channel mode over the link.

21. The method of claim 20, further comprising the step of:

(c) returning to in-band signaling for communications between the at least two users.

22. The method of claim 21, wherein step (c) comprises the step of conveying in-band signaling information during the clear channel mode, thus resuming the use of in-band signaling.

23. The method of claim 21, wherein step (c) comprises the step of conveying out-of-band signaling information during the clear channel mode, thus resuming the use of in-band signaling.

24. The method of claim 20, wherein step (b) comprises the step of entering into the clear channel mode during which user information is conveyed free of in-band signaling.

25. The method of claim 24, further comprising the step of conveying signaling information through an out-of-band channel during the clear channel mode.

26. A method for conveying information in a communication network that uses in-band signaling, the method comprising the steps of:

(a) establishing communications between at least two users of the communication network;

(b) suspending in-band signaling during communications between the at least two users allowing the information to be conveyed in a clear channel mode; and (c) returning to in-band signaling for communications between the at least two users.

* * * * *